United States Patent
Golsch

(10) Patent No.: US 10,967,836 B2
(45) Date of Patent: Apr. 6, 2021

(54) PHONE AS A KEY VEHICLE ACCESS BASED ON TIME POLICIES, LICENSE INFORMATION AND VALIDATION AND ACCURACY OF A VEHICLE REAL TIME CLOCK

(71) Applicants: DENSO International America, Inc., Southfield, MI (US); DENSO CORPORATION, Kariya (JP)

(72) Inventor: Kyle Golsch, Pontiac, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 0 days.

(21) Appl. No.: 16/786,275

(22) Filed: Feb. 10, 2020

(65) Prior Publication Data

US 2020/0298799 A1   Sep. 24, 2020

Related U.S. Application Data

(60) Provisional application No. 62/821,495, filed on Mar. 21, 2019.

(51) Int. Cl.
*B60R 25/24* (2013.01)
*H04W 88/02* (2009.01)
(Continued)

(52) U.S. Cl.
CPC .......... *B60R 25/24* (2013.01); *B60R 25/209* (2013.01); *H04W 12/0609* (2019.01);
(Continued)

(58) Field of Classification Search
CPC .................................................. G08B 13/02
See application file for complete search history.

(56) References Cited

U.S. PATENT DOCUMENTS

| 9,688,247 B1 | 6/2017 | Jayaraman et al. |
| 9,794,753 B1 | 10/2017 | Stitt et al. |

(Continued)

FOREIGN PATENT DOCUMENTS

| BR | 102014017465 A2 | 2/2016 |
| CN | 104574593 A | 4/2015 |

(Continued)

*Primary Examiner* — Joseph H Feild
*Assistant Examiner* — Pameshanand Mahase
(74) *Attorney, Agent, or Firm* — Harness, Dickey & Pierce, P.L.C.

(57) ABSTRACT

Systems and methods for an in-vehicle device for a phone as a key (PAK) system of a vehicle are provided. The in-vehicle device includes a control module that determines an age of a latest obtained certificate, including license information, and determines whether the latest certificate is outdated. If the latest certificate is outdated, the control module transmits an instruction signal from the vehicle to a mobile device to obtain an updated certificate. If the certificate is not outdated, the control module determines whether the license information is accurate. Based on whether the license information is accurate, the control module determines an accuracy level of the local time or the date. Based on the accuracy level, the control module adjusts an access tolerance time, permits the user to access the vehicle, or transmits the instruction signal from the vehicle to the mobile device to obtain the updated certificate.

20 Claims, 7 Drawing Sheets

(51) Int. Cl.
*H04W 12/06* (2021.01)
*B60R 25/20* (2013.01)
*H04L 29/08* (2006.01)

(52) U.S. Cl.
CPC ......... *B60R 2325/205* (2013.01); *H04L 67/10* (2013.01); *H04W 88/02* (2013.01)

(56) References Cited

U.S. PATENT DOCUMENTS

| | | | |
|---|---|---|---|
| 9,894,492 | B1 | 2/2018 | Elangovan et al. |
| 10,002,479 | B2 | 6/2018 | Oz et al. |
| 10,244,476 | B2 | 3/2019 | Elangovan et al. |
| 10,328,898 | B2 | 6/2019 | Golsch et al. |
| 10,328,899 | B2 | 6/2019 | Golsch |
| 10,328,900 | B1 | 6/2019 | Yakovenko et al. |
| 2011/0215921 | A1 | 9/2011 | Ben Ayed et al. |
| 2012/0045058 | A1 | 2/2012 | Weghaus |
| 2012/0188072 | A1* | 7/2012 | Dawes ................ H04L 12/2825 340/514 |
| 2014/0274013 | A1 | 9/2014 | Santavicca |
| 2014/0303837 | A1* | 10/2014 | Tuukkanen ............ G06Q 30/06 701/36 |
| 2015/0148989 | A1 | 5/2015 | Cooper et al. |
| 2015/0161832 | A1 | 6/2015 | Esselink et al. |
| 2015/0310681 | A1 | 10/2015 | Avery et al. |
| 2015/0356797 | A1 | 12/2015 | McBride et al. |
| 2016/0150407 | A1 | 5/2016 | Michaud et al. |
| 2017/0062938 | A1 | 3/2017 | Cheng et al. |
| 2017/0104589 | A1 | 4/2017 | Lambert et al. |
| 2017/0132533 | A1 | 5/2017 | Darnell et al. |
| 2017/0175419 | A1* | 6/2017 | Chiu ...................... E05B 39/04 |
| 2017/0257345 | A1* | 9/2017 | Westra ................. H04L 63/029 |
| 2017/0309098 | A1 | 10/2017 | Watters et al. |
| 2017/0330402 | A1 | 11/2017 | Menard et al. |
| 2018/0029560 | A1 | 2/2018 | Mohaupt et al. |
| 2018/0099643 | A1 | 4/2018 | Golsch et al. |
| 2018/0103414 | A1 | 4/2018 | Golsch |
| 2018/0126952 | A1 | 5/2018 | Niemiec |
| 2018/0154865 | A1 | 6/2018 | Bianchi, III et al. |
| 2018/0261027 | A1 | 9/2018 | Fujiwara et al. |
| 2018/0269565 | A1 | 9/2018 | Guthrie et al. |
| 2020/0043063 | A1* | 2/2020 | London .............. G06Q 30/0281 |

FOREIGN PATENT DOCUMENTS

| | | |
|---|---|---|
| JP | 2016017806 A | 2/2016 |
| WO | WO-16156682 A1 | 10/2016 |
| WO | WO-2017181050 A1 | 10/2017 |
| WO | WO-18040641 A1 | 3/2018 |

* cited by examiner

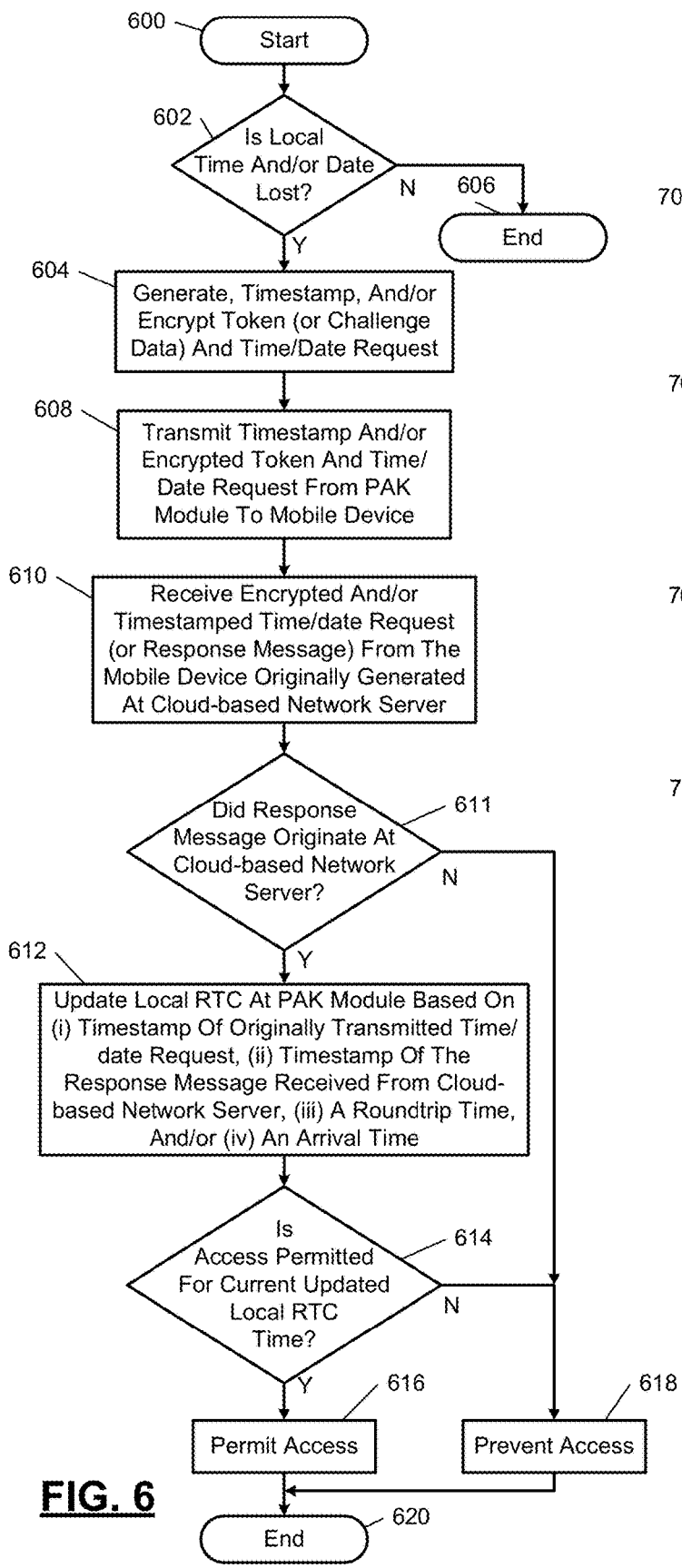
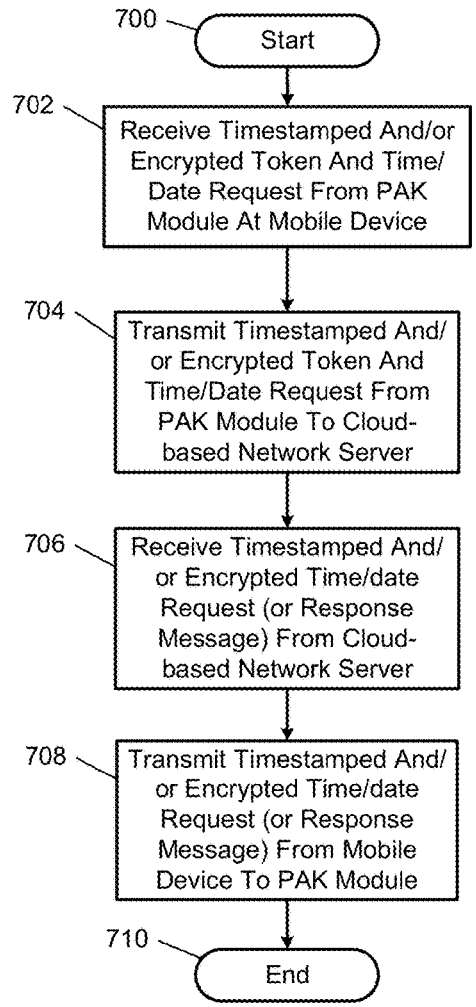
FIG. 6
FIG. 7

PHONE AS A KEY VEHICLE ACCESS BASED ON TIME POLICIES, LICENSE INFORMATION AND VALIDATION AND ACCURACY OF A VEHICLE REAL TIME CLOCK

CROSS-REFERENCE TO RELATED APPLICATION

This application claims the benefit of U.S. Provisional Application No. 62/821,495, filed on Mar. 21, 2019. The entire disclosure of the above application is incorporated herein by reference.

FIELD

The present disclosure relates to passive entry passive start (PEPS) systems, and more particularly to phone as a key vehicle (PAK) access systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Traditionally, a PEPS system is a passive keyless entry system that allows a person in possession of a key fob, previously paired with a vehicle's central PEPS electronic control unit (ECU), to (i) access the vehicle by simply grabbing the door handle, and (ii) start the vehicle with a push of a button. The central PEPS ECU (i) performs an authentication process to determine if the key fob is authorized to access the vehicle, and (ii) determines a location of the key fob relative to the vehicle. The authentication process may include the exchange of an encrypted password or signature. If the password or signature is correct, then the key fob is determined to be authorized. Location of the key fob may be determined based on, for example, strength of a signal received from the key fob. If the key fob is authenticated and is located within an authorized zone of the vehicle, then access to the vehicle is permitted. This may include, unlocking doors and permitting the vehicle to start.

A PAK vehicle access system can operate similarly as the stated PEPs system, except the vehicle is accessed using a mobile phone rather than a key fob. As an example, the mobile phone can communicate with a PAK module or a telematics control unit (TCU) in the vehicle to begin an access pairing process. The mobile phone and either the PAK module or the TCU perform the access pairing process to establish a trust relationship. The pairing process can include Bluetooth® pairing whereby: security information is exchanged between the mobile phone and the vehicle directly; a mobile phone address, a mobile phone identity resolving key, a reservation identifier and/or an encryption key are exchanged via a cloud-based network; and/or the mobile phone presents a certificate to the vehicle, where the certificate is signed by (i) the mobile phone, (ii) a trusted security signing authority such as a manufacturer of the vehicle, and/or (iii) a trusted third party.

In the case of a certificate, the certificate can include an identifier of a person authorized to access a vehicle, an identifier of a cloud-based network authorized to transfer the certificate, an identifier of a rental or lease agreement of the vehicle, an identifier of the vehicle, a date and time period during which the vehicle is permitted for use by the authorized person, and/or other restrictions and/or access/license information.

SUMMARY

This section provides a general summary of the disclosure, and is not a comprehensive disclosure of its full scope or all of its features.

An in-vehicle device for a phone as a key (PAK) system of a vehicle is described herein. The in-vehicle device includes a memory configured to store one or more applications and a date, a clock configured to maintain a local time, and a control module. The control module is configured to execute the one or more applications and when executing the one or more applications the control module is configured to determine an age of a latest certificate obtained by the control module, wherein the latest certificate comprises license information, and determine whether the latest certificate or signature of the certificate is outdated. If the latest certificate or the signature is outdated, the control module is configured to transmit an instruction signal from the vehicle to a mobile device of a user to obtain updated certificate. If the certificate or the signature is not outdated, the control module is configured to determine whether the license information is accurate. Based on whether the license information is accurate, the control module is configured to determine an accuracy level of at least one of the local time or the date. Based on the accuracy level of the at least one of the local time or the date, the control module is configured to adjust an access tolerance time, permit the user to access the vehicle, or transmit the instruction signal from the vehicle to the mobile device to obtain the updated certificate.

In other features, the license information includes an identifier of the user, an identifier of the vehicle, and a period of time indicating when the user is permitted access to the vehicle.

In other features, the control module is further configured to receive credential information from the mobile device, while determining whether the license information is correct, determining whether the credential information is correct, and based on whether the credential information is correct, determine the accuracy level of the at least one of the local time or the date.

In other features, the control module is further configured to receive a first certificate from the mobile device, access a second certificate stored in the memory, and determine which one of the first certificate and the second certificate is the latest certificate.

In other features, the control module is further configured to receive the updated certificate from the mobile device, wherein the updated certificate originates at a cloud-based network server and update the local time based on a timestamp of the updated certificate.

In other features, the control module is further configured to determine whether license information in the updated certificate is accurate and based on whether the license information in the updated certificate is accurate and indicates that the user is permitted to access the vehicle during a current period of time, at least one of provide access to an interior of the vehicle or start the vehicle.

In other features, the control module is further configured to, if the accuracy level of the local time is less than or equal to a first predetermined accuracy level, transmit the instruction signal from the vehicle to the mobile device to obtain the updated certificate. If the accuracy level of the local time is equal to a second predetermined level, the control module is configured to adjust the access tolerance time. If the accuracy level of the local time is greater than the second predetermined level, the control module is configure dto permit the user to access the vehicle.

In other features, a PAK system includes the in-vehicle device of claim and the mobile device comprises a mobile device control module configured to receive the instruction signal, based on the instruction signal, obtain the updated certificate, and transmit the updated certificate to the in-vehicle device.

A method is also provided and includes operating a phone as a key (PAK) system for a vehicle. The method includes storing a date in a memory of the vehicle;

maintaining a local time and determining an age of a latest certificate obtained by a control module of the vehicle, wherein the latest certificate comprises license information. The method also includes determining whether the latest certificate or signature of the certificate is outdated. The method also includes, if the latest certificate or the signature is outdated, transmitting an instruction signal from the vehicle to a mobile device of a user to obtain updated certificate. The method also includes, if the certificate or the signature is not outdated, determining whether the license information is accurate. The method also includes, based on whether the license information is accurate, determining an accuracy level of at least one of the local time or the date. The method also includes, based on the accuracy level of the at least one of the local time or the date, adjusting an access tolerance time, permitting the user to access the vehicle, or transmitting the instruction signal from the vehicle to the mobile device to obtain the updated certificate.

In other features, the license information includes an identifier of a user, an identifier of the vehicle, and a period of time indicating when the user is permitted access to the vehicle.

In other features, the method further includes receiving credential information from the mobile device, while determining whether the license information is correct, determining whether the credential information is correct, and based on whether the credential information is correct, determining the accuracy level of the at least one of the local time or the date.

In other features, the method further includes receiving a first certificate from the mobile device, accessing a second certificate stored in the memory, and determining which one of the first certificate and the second certificate is the latest certificate.

In other features, the method further includes receiving the updated certificate from the mobile device, wherein the updated certificate originates at a cloud-based network server and updating the local time based on a timestamp of the updated certificate.

In other features, the method further includes determining whether license information in the updated certificate is accurate and, based on whether the license information in the updated certificate is accurate, indicating that the user is permitted to access the vehicle during a current period of time, at least one of providing access to an interior of the vehicle or starting the vehicle.

In other features, the method further includes, if the accuracy level of the local time is less than or equal to a first predetermined accuracy level, transmitting the instruction signal from the vehicle to the mobile device to obtain the updated certificate. The method further includes, if the accuracy level of the local time is equal to a second predetermined level, adjusting the access tolerance time.

The method further includes, if the accuracy level of the local time is greater than the second predetermined level, permitting the user to access the vehicle.

In other features, the method further includes receiving the instruction signal at the mobile device, based on the instruction signal, obtaining the updated certificate, and transmitting the updated certificate to the vehicle.

An in-vehicle device for a phone as a key (PAK) system of a vehicle is disclosed and includes a memory configured to store one or more applications and a date, a clock configured to maintain a local time, and a control module. The control module is configured to execute the one or more applications and when executing the one or more applications the control module is configured to determine whether at least one of the local time or the date is lost. Based on whether the at least one of the local time or the date is lost, the control module is configured to generate, timestamp and encrypt an access period request, wherein the access period request includes challenge data and a time and date request. The control module is further configured to transmit the timestamped and encrypted request to a cloud-based network server via a mobile device of a user, wherein the timestamped and encrypted request is transmitted to the mobile device for subsequent forwarding to the cloud-based network server. The control module is configured to receive a response message from the mobile device based on the timestamped and encrypted request. The control module is further configured to verify and authenticate the response message, update at least one of the local time or the date based on content in the response message, determine whether access to the vehicle is permitted based on the updated at least one of the local time or the date, and permit access to the vehicle if the updated at least one of the local time or date is within a predetermined and permitted access period for the user.

In other features, the response message includes the challenge data.

In other features, the response message does not include the challenge data.

In other features, the response message includes a modified version of the challenge data.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The present disclosure will become more fully understood from the detailed description and the accompanying drawings, wherein:

FIG. 6 illustrates an example access method implemented by a PAK module accounting for when a RTC time and/or date is lost in accordance with an embodiment of the present disclosure;

FIG. 7 illustrates an example timestamp acquisition method implemented by a mobile device along with the access method of FIG. 6 and in accordance with an embodiment of the present disclosure.

In the drawings, reference numbers may be reused to identify similar and/or identical elements.

DETAILED DESCRIPTION

Figure 1:
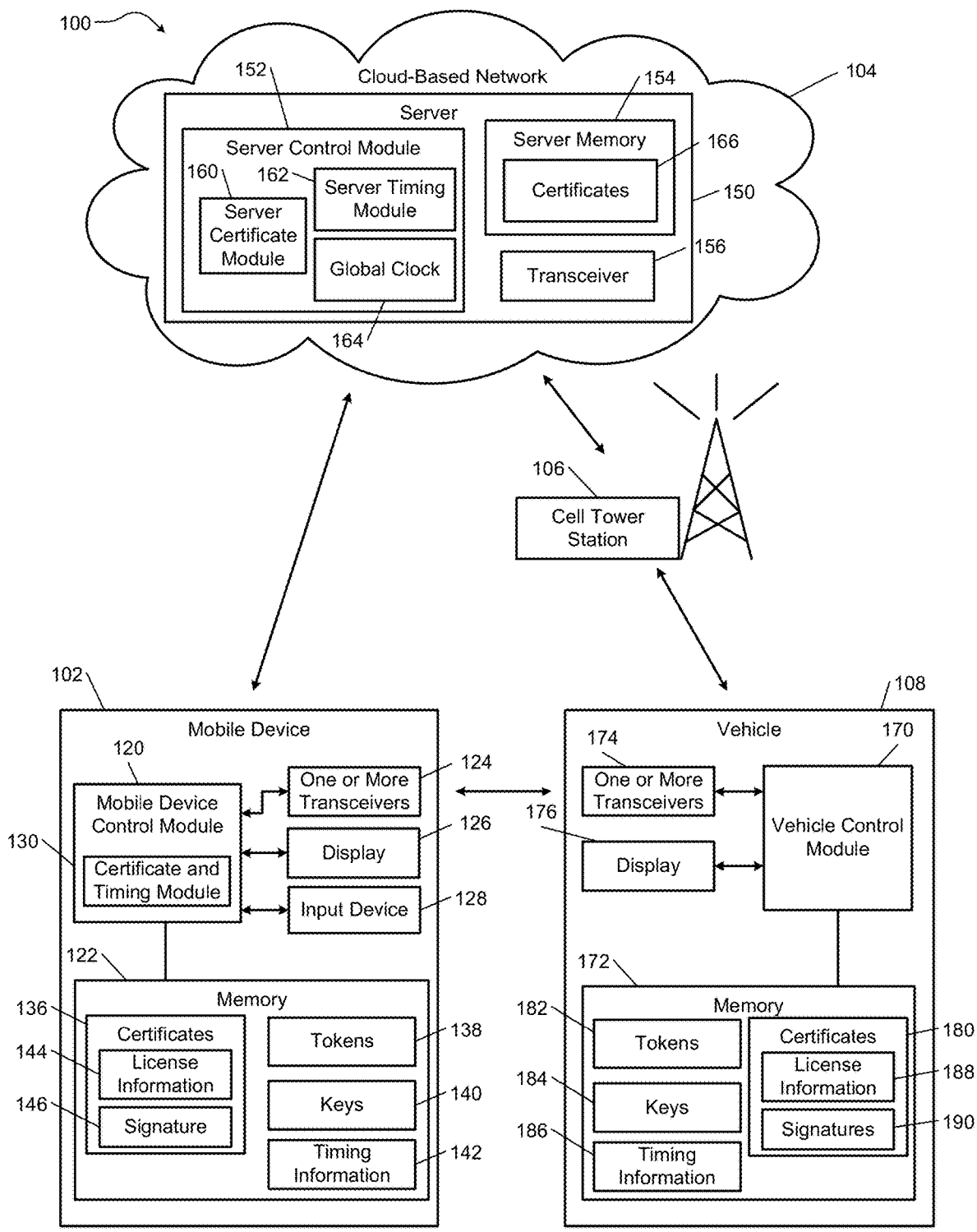
FIG. 1 a functional block diagram of an example of an access network including a vehicle implementing a PAK system in accordance with an embodiment of the present disclosure.

During operation of a PAK system, a user may approach a vehicle and a mobile device carried by the user may provide credentials to a PAK module of the vehicle to obtain access to the vehicle. As an example, the vehicle may be a rental vehicle, a car sharing vehicle, a company vehicle, etc. The credentials may include a name of the user, a password or security code, an identifier of the vehicle and/or other security information. In addition to the credentials being provided to the PAK module, the mobile device may also send a certificate with license information to a cloud-based server. The license information may include a name of the user, a rental transaction or contract number, an identification number of the vehicle, a signature, dates and times when the vehicle is permitted to be used by the user, etc. The cloud-based server may verify the dates and times indicated in the certificate and then send the certificate and/or a message to a telematics control unit (TCU), such as an OnStar® module, of the vehicle. The message may indicate whether the user is permitted to access the vehicle for a current date and time and whether the dates and times in the certificate are accurate. This information may be added to the certificate and the message may not be sent.

In addition, a PAK module of the vehicle may communicate with the mobile device and determine a location of the mobile device relative to the vehicle. The PAK module and/or a vehicle control module may provide access to the vehicle based on: the credentials; a locally stored date and a local clock time, which are updated and maintained by the vehicle; information in the certificate received from the cloud-based server; and the determined distance between the mobile device and the vehicle. The local clock time may be provided via a real time clock (RTC) of the PAC module.

The vehicle may synchronize the local clock time and match the local stored date to, for example, a global positioning system (GPS) clock time and date, a time and date received from a cellular network, or other global clock time and date. Based on the local time and a current date, the PAK module, a PEPS module or other vehicle access control module may communicate with the TCU to determine whether the user is permitted to access the vehicle at the current local clock time and on the current locally stored date. The vehicle access control module may send a request message to the TCU requesting confirmation that the current user is permitted to operate this particular vehicle and/or has a contract providing the user with permitted use of the vehicle during a current period of time. As a couple of alternatives, the PAK module and the TCU may be implemented as a same single module, or the PAK module may receive the certificate and verify license information associated with the user. Access is prevented if the user is attempting to access the vehicle at a time that is outside of the permitted period of time and not on the allotted date.

Certain situations can arise when: the vehicle losses the local time and/or the locally stored date; the local time and date drift and/or become inaccurate; and/or the PAK module and/or TCU are inoperative or are unable to acquire the correct time and date due to, for example, a loss in power or a communication link with a cellular station, a satellite, and/or a cloud-based server. As an example, a vehicle may experience a battery reset meaning power from a battery may be temporarily disconnected, which can cause a local clock time and/or date to be incorrect or reset to a default time and date. Access to a vehicle may be prevented when these situations occur. In a worst case scenario, such as when the battery is disconnected and the local time and date are lost, a user may be indefinitely locked out of the vehicle until a service technician is able to obtain access to the vehicle. This can be especially undesirable to a user if the user and vehicle are in a remote location or are without another form of transportation.

Also, certain vehicles may not have a TCU and thus may not be able to communicate with a cellular network (e.g., long term evolution (LTE) network) and obtain an updated certificate, updated license information, and/or an updated time and date. This can eventually result in the stored certificate and license information becoming outdated and the local time and/or date becoming inaccurate.

The examples set forth herein include secure PAK systems and methods for providing access to a vehicle during the above-stated situations. The methods include communication between PAK modules of vehicles, mobile devices of users, and cloud-based servers. In one embodiment, the communication is based on accuracy of a RTC of a vehicle and time window and RTC policies. In another embodiment, the communication includes transmission, processing and evaluation of encrypted tokens, time requests, and timestamps.

FIG. 1 shows an access network 100 incorporating a mobile device 102, a cloud-based network 104, a cell tower station 106 and a vehicle 108. The mobile device 102 may include a mobile device control module 120, a memory 122, one or more transceivers 124, a display 126 and an input device 128 (e.g., a touch screen, a mouse, a keyboard, etc.). The mobile device control module 120 may include a certificate and timing module 130. The certificate and timing module 130 receives, accesses and/or transmits certificates, timestamps, times, dates, etc. to and from the cloud-based network 104 and the vehicle 108. Operation of the certificate and timing module 130 is further described below. The mobile device 102 (or network device) may be a mobile phone, a laptop computer, a wearable device, and/or other mobile network device.

The memory 122 may store, for example, certificates 136, tokens 138, keys 140, and timing information 142. The certificates 136 may include license information 144 and signatures 146. The license information may include: a user name; a vehicle identification number; a rental, lease and/or contract number; a signature as described above; permitted access times and dates; permitted access periods; and/or other license information.

The cloud-based network 104 includes one or more cloud-based network servers (one server 150 is shown). The server 150 may include a server control module 152, a server memory 154, and a transceiver 156. The server control module 152 includes a server certificate module 160, a server timing module 162 and a global clock 164. The server memory 154 may store certificates 166.

The cell tower station 106 may transmit certificates and/or corresponding license information and timing information between the server 150 and the vehicle 108. The timing information may include a current timestamp and/or a global clock time for synchronization of a local clock time to the global clock time. The local clock time is maintained within the vehicle 108.

The vehicle 108 may include a vehicle control module 170, a memory 172, one or more transceivers 174, and a display 176. The memory 172 may store, for example, certificates 180, tokens 182, keys 184, and timing information 186, which may be the same as, similar to, or different than the certificates, tokens, keys, and timing information stored in the memory 122 of the mobile device 102 or in the memory 154 of the server 150. The certificates 180 may include license information 188 and signatures 190. The license information 188 may be the same, similar to, or different than the license information stored in the memories 122, 154.

The modules of the mobile device 102, the cloud-based network 104 and the vehicle 108 communicate with each other via the transceivers 124, 156, and 174. The vehicle control module 170 and/or other module of the vehicle 108 may communicate with the mobile device control module 120 directly via the transceivers 124, 174. The vehicle control module 170 may communicate with the server 150 indirectly via the cell tower station 106 or other intermediary stations and/or devices.

Figure 2:
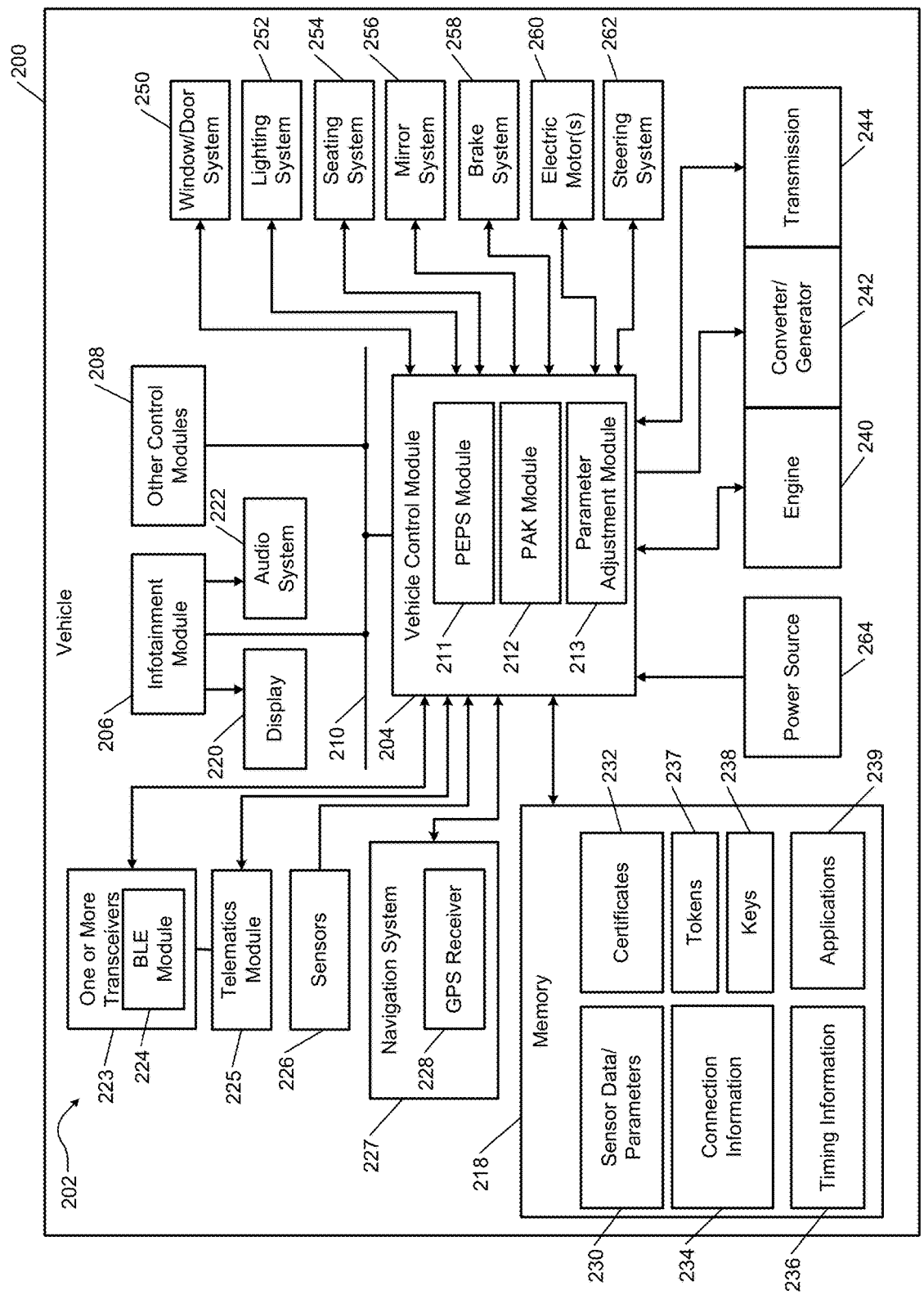
FIG. 2 is a functional block diagram of an example of a vehicle including a PAK module operating in accordance with an embodiment of the present disclosure.
Figure 3:
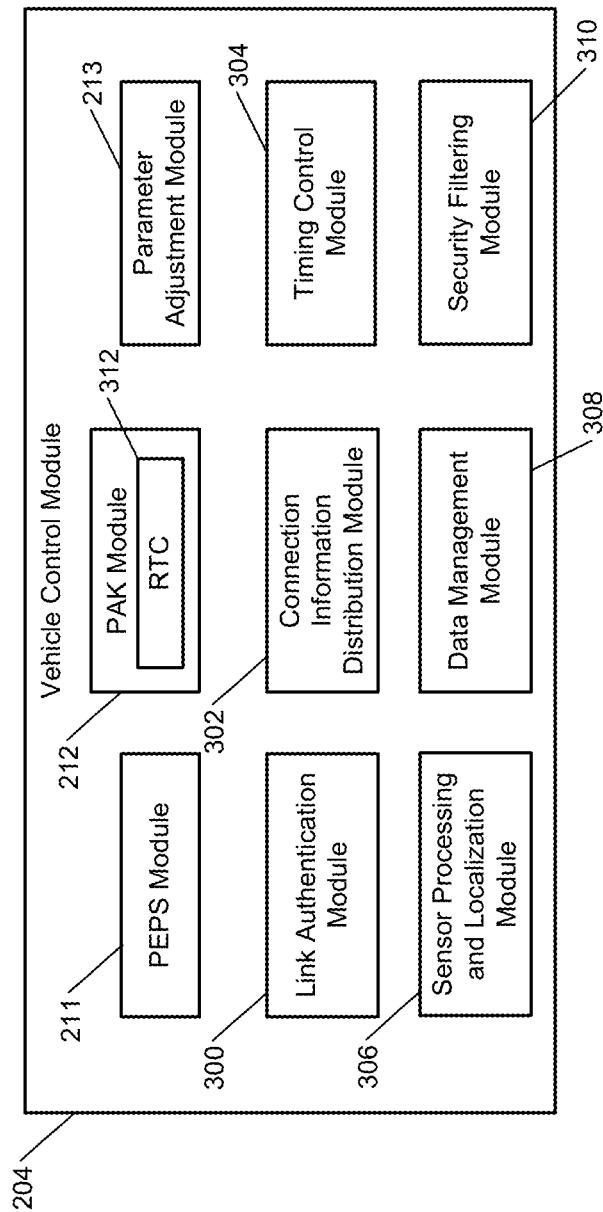
FIG. 3 is a functional block diagram of an example of a vehicle control module of the vehicle of FIG. 2 in accordance with an embodiment of the present disclosure.

FIG. 2 shows a vehicle 200 that is an example of the vehicles 108 of FIG. 1. The vehicle 200 includes a PAK system 202, which includes a vehicle control module 204, an infotainment module 206 and other control modules 208. The modules 204, 206, 208 may communicate with each other via a controller area network (CAN) bus 210. The vehicle control module 204 may control operation of vehicles systems. The vehicle control module 204, may include a PEPS module 211, a PAK module 212 and a parameter adjustment module 213, as well as other modules, which are shown in FIG. 3.

The PEPS module 211 may perform PEPS operations to provide access to an interior of the vehicle and permit starting and/or operation of the vehicle. The PAK module 212 operates in cooperation with the PEPS module 211 and performs PAK operations as described herein. The PEPS module 211 may include the PAK module 212 or the modules 211, 212 may be implemented as a single module. The parameter adjustment module 213 may be used to adjust parameters of the vehicle 200.

The PAK system 202 may further include: a memory 218; a display 220; an audio system 222; one or more transceivers 223 including a Bluetooth Low Energy (BLE) module 224; a telematics module 225; sensors 226; and a navigation system 227 including a global positioning system (GPS) receiver 228. The BLE module 224 may be used to communicate with a mobile device (e.g., the mobile device 102 of FIG. 1). The telematics module 225 may communicate with the server 150 via the cell tower station 106 of FIG. 1 as described above. This may include the transfer of certificates, license information, and/or timing information including global clock timing information. The sensors 226 may include sensors used for PEPS and PAK operations, cameras, objection detection sensors, temperature sensors, accelerometers, vehicle velocity sensor, and/or other sensors. The GPS receiver 228 may provide vehicle velocity and/or direction (or heading) of the vehicle and/or global clock timing information.

The memory 218 may store sensor data and/or parameters 230, certificates 232, connection information 234, timing information 236, tokens 237, keys 238, and applications 239. The applications 239 may include applications executed by the modules 204, 206, 208. As an example, one of the applications may be a PEPS application and/or a PAK application executed by the modules 204, 211, and/or 212. Although the memory 218 and the vehicle control module 204 are shown as separate devices, the memory 218 and the vehicle control module 204 may be implemented as a single device. The single device may include one or more other devices shown in FIG. 2.

The vehicle control module 204 may control operation of an engine 240, a converter/generator 242, a transmission 244, a window/door system 250, a lighting system 252, a seating system 254, a mirror system 256, a brake system 258, electric motors 260 and/or a steering system 262 according to parameters set by the modules 204, 206, 208. The vehicle control module 204 may perform PEPS and/or PAK operations, which may include setting some of the parameters. The PEPS and PAK operations may be based on signals received from the sensors 226. The vehicle control module 204 may receive power from a power source 264 which may be provided to the engine 240, the converter/generator 242, the transmission 244, the window/door system 250, the lighting system 252, the seating system 254, the mirror system 256, the brake system 258, the electric motors 260 and/or the steering system 262, etc. Some of the PEPS and PAK operations may include unlocking doors of the window/door system 250, enabling fuel and spark of the engine 240, starting the electric motors 260, powering any of the systems 250, 252, 254, 256, 258, 262, and/or performing other operations as are further described herein.

The engine 240, the converter/generator 242, the transmission 244, the window/door system 250, the lighting system 252, the seating system 254, the mirror system 256, the brake system 258, the electric motors 260 and/or the steering system 262 may include actuators controlled by the vehicle control module 204 to, for example, adjust fuel, spark, air flow, steering wheel angle, throttle position, pedal position, door locks, window position, seat angles, etc. This control may be based on the outputs of the sensors 226, the navigation system 227, the GPS 228 and the above-stated data and information stored in the memory 218.

FIG. 3 shows the vehicle control module 204. The vehicle control module 204 includes the PEPS module 211, the PAK module 212, the parameter adjustment module 213 and may further include a link authentication module 300, a connection information distribution module 302, a timing control module 304, a sensor processing and localization module 306, a data management module 308 and a security filtering module 310. The PAK module 212 may include a RTC 312 that maintains a local clock time.

The link authentication module 300 may authenticate the mobile device 102 of FIG. 1 and establish the secure communication link. For example, the link authentication module 300 can be configured to implement challenge-response authentication.

The connection information distribution module 302 is configured to communicate with some of the sensors 226 of FIG. 2 and to provide the sensors with communication information necessary for the sensors to find and then follow, or eavesdrop on, the secure communication link.

This may occur once the sensors are synchronized with a communication gateway, which may be included in or implemented by one of the transceivers 223. As an example, the PAK system 202 may include any number of sensors disposed anywhere on the vehicle 200 for detecting and monitoring mobile devices.

The timing control module 304 may: maintain the RTC and/or currently stored date if not handled by the PAK module 212; disseminate current timing information with the sensors; generate timestamps for incoming and outgoing messages, requests, signals, certificates, and/or other items; calculate round trip times; etc. A round trip time may refer to the amount between when a request is generated and/or transmitted and a time when a response to the request is received. Other example round trip times are described below.

After link authentication is established, the data management module 308 collects the current location of the vehicle 108 from the telematics module 225 and shares the location with the mobile device 102. The mobile device 102 optionally includes a GPS module and application software that when executed compares the estimated relative location of the mobile device 102 to the vehicle 108. Based on the estimated position of the mobile device 102 relative to the vehicle 108, the mobile device 102 can send signals to one of the transceivers 223 and/or the communication gateway requesting the vehicle to perform certain actions.

The security filtering module 310 is configured to flag data as injected such that the sensor processing and localization module 306 is able to discard data and alert the PEPS module 211. The data from the sensor processing and localization module 306 is passed along to the PEPS module 211, whereby the PEPS module 211 is configured to read vehicle state information from the sensors in order to detect user intent to access a feature and to compare the location of the mobile device 102 to a set of locations that authorize certain vehicle features, such as unlocking a door or trunk of the vehicle and/or starting the vehicle.

Figure 4:
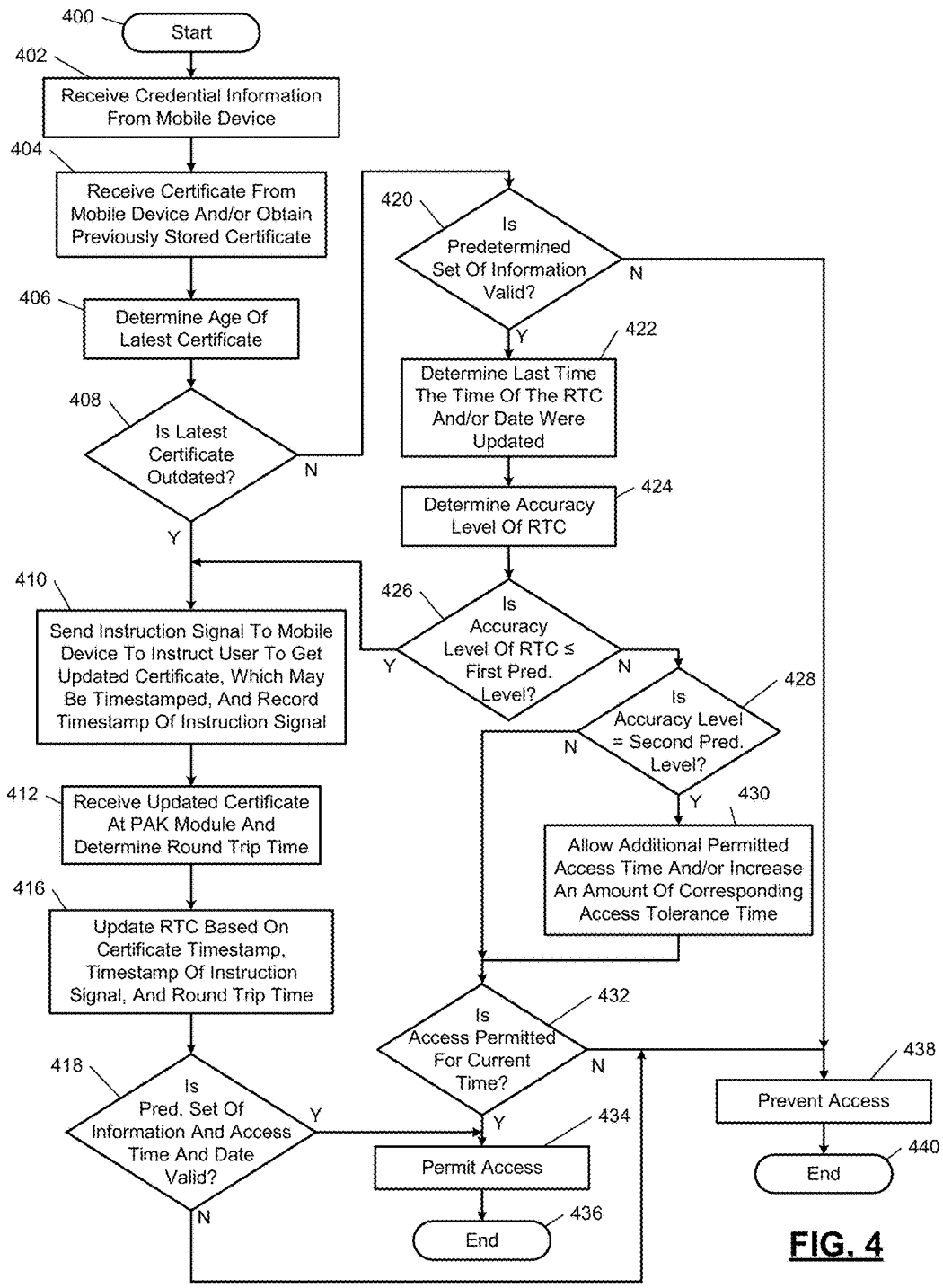
FIG. 4 illustrates an example access method implemented by a PAK module accounting for when a real time clock (RTC) is inaccurate and/or policies are not satisfied in accordance with an embodiment of the present disclosure.
Figure 5:
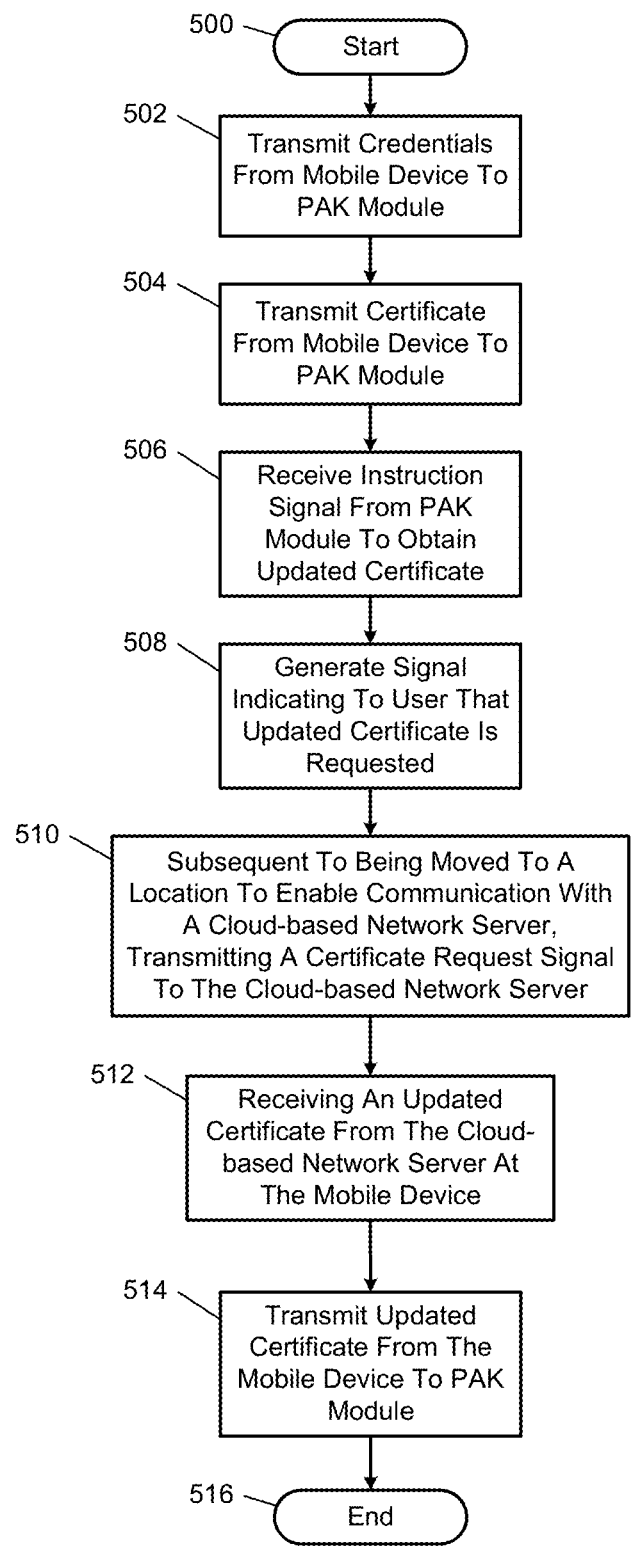
FIG. 5 illustrates an example certificate acquisition method implemented by a mobile device along with the access method of FIG. 4 and in accordance with an embodiment of the present disclosure.
Figure 8:
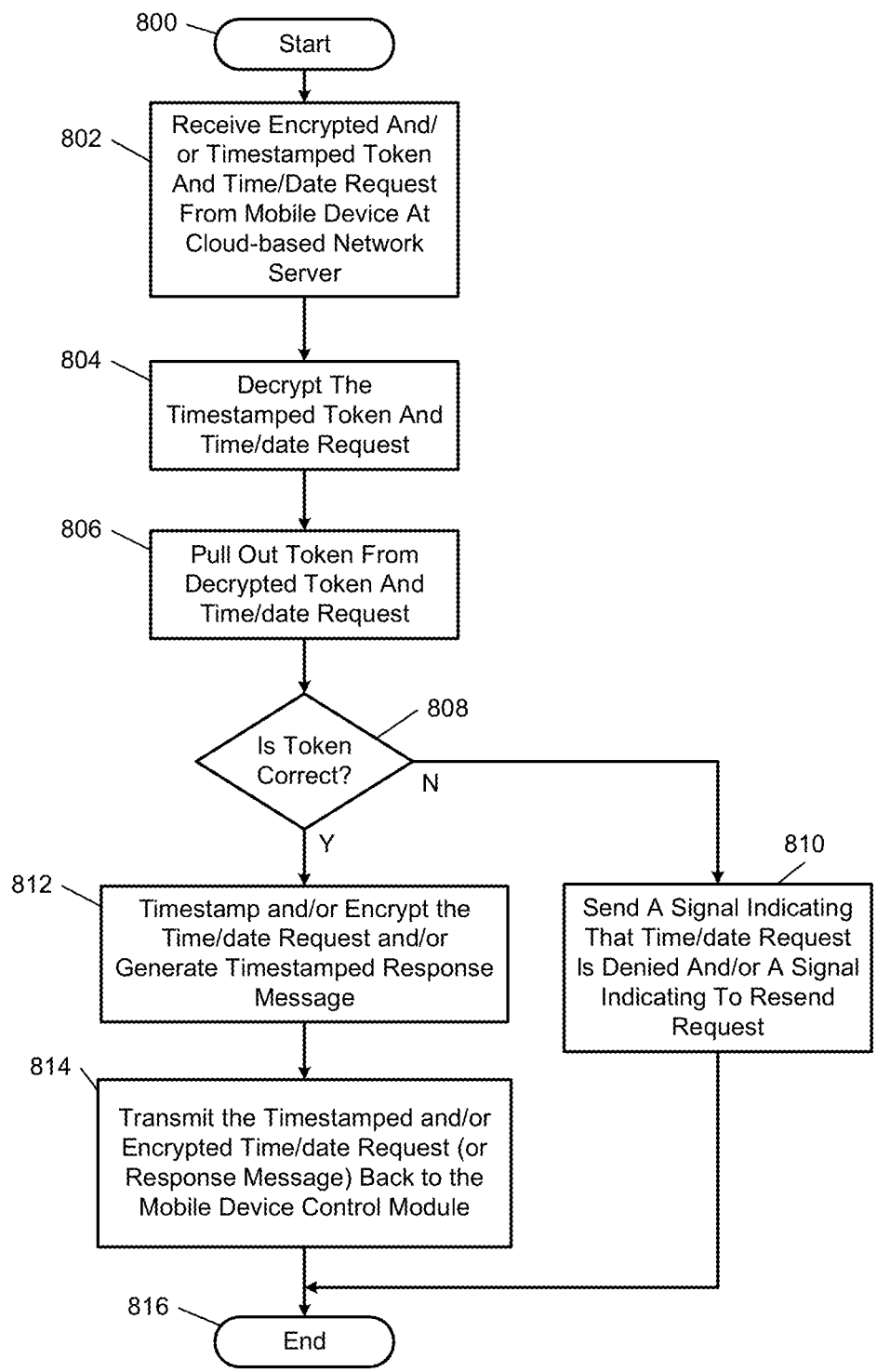
FIG. 8 illustrates an example timestamp provision method implemented by a cloud-based network server along with the access method of FIG. 6 and the timestamp acquisition method of FIG. 7 and in accordance with an embodiment of the present disclosure.

The systems disclosed herein may be operated using numerous methods, example methods are illustrated in FIGS. 4-8. The methods may be performed when, for example, the corresponding vehicle (e.g., the vehicle 200) is without a telematics module (or TCU), the telematics module is inoperative, and/or the telematics module is unable to communicate with a cloud-based network server or other device to obtain an updated certificate, time and/or date. In FIG. 4, an example access method implemented by a PAK module accounting for when a real time clock (RTC) is inaccurate and/or policies are not satisfied is shown. Although the methods are shown as separate methods, one or more of the methods and/or operations from separate methods may be combined and performed as a single method. For example, the method of FIG. 4 may be performed while the method of FIG. 5 is performed. Similarly, the method of FIG. 6 may be performed while the methods of FIGS. 7 and 8 are performed. Although the following operations are primarily described with respect to the implementations of FIGS. 1-3, the operations may be easily modified to apply to other implementations of the present disclosure. The operations may be iteratively performed and may be performed by, for example, the modules 204, 211, 212, and 304.

The method may begin at 400. At 402, the PAK module 212 or other module of the vehicle control module 170 may receive credential information from the certificate and timing module 130. The credential information may include a name of the user, a password or security code, an identifier of the vehicle 200 and/or other security information.

At 404, the PAK module 212 may also receive from the certificate and timing module 130 a certificate with license information and/or obtain a certificate previously stored in the memory 218. The license information may include a name of the user, a rental transaction or contract number, an identification number of the vehicle 200, dates and times when the vehicle is permitted to be used by the user, etc.

At 406, the PAK module 212 may determine age of a latest one of the received and/or obtained certificates associated with the mobile device 102 and/or corresponding user. This also indicates the age of a signature provided on the latest certificate. At 408, the PAK module 212 determines if the latest certificate is outdated. For example, the PAK module 212 may operate based on a certificate age policy for which if the certificate and/or signature is more than a predetermined age (e.g., time since originally generated), then the PAK module 212 is to disregard the certificate and instruct the user to obtain an updated certificate. If the latest certificate is outdated, operation 410 may be performed, otherwise operation 420 is performed.

At 410, the PAK module 212 generates and transmits an instruction signal to the certificate and timing module 130 to instruct the user to obtain an updated certificate. The instruction signal may be timestamped prior to being transmitted and the time stamp may be stored in the memory 218.

At 412, the PAK module 212 receives an updated certificate from the certificate and timing module 130. As described with respect to the method of FIG. 5, the certificate and timing module 130 may request and receive the updated certificate from the cloud-based network server 150. The PAK module 212 may determine a round trip time from when the instruction signal was transmitted to the certificate and timing module 130 until when the PAK module 212 receives the updated certificate. The updated certificate may have been timestamped by the cloud-based network server 150 and/or the certificate and timing module 130.

At 416, the PAK module 212 updates the RTC 312 based on the timestamps of the updated certificate, the timestamp when the instruction signal was transmitted to the certificate and timing module 130, the timestamp when the updated certificate was received, and/or the calculated round trip time.

At 418, the PAK module 212 may determine whether a predetermined set of information received as part of the credential information and/or in the updated certificate are valid and whether the current access time and date are valid. The predetermined set of information may include the user name, vehicle identification number, rental and/or contract number, origin of the updated certificate, and/or other information is valid. This may include comparing information received in the credentials with information in the updated certificate and/or information stored in the memory 218. If the predetermined set of information is valid, then operation 434 may be performed to provide access to the vehicle 108, otherwise operation 438 may be performed to prevent access to the vehicle 108. The method may end at 436 or 440.

At 420, the PAK module 212 may determine whether the predetermined set of information received as part of the credential information and/or the latest certificate is valid. The predetermined set of information may include the same or similar types of information evaluated during operation 418 and may include the user name, vehicle identification number, rental and/or contract number, origin of the updated certificate, and/or other information is valid. This may include comparing information received in the credentials with information in the latest certificate and/or information stored in the memory 218. If the predetermined set of information is valid, operation 422 is performed, otherwise operation 438 may be performed. At 422, the PAK module 212 determines a last time that the time of the RTC 312 and/or stored date were updated by, for example, the PAK module 212.

At 424, the PAK module 212 may determine an accuracy level of the time of the RTC 312. The accuracy level may be determined based on the amount of time since the time of the RTC was last updated, a known or estimated drift rate of the RTC, an age of the vehicle control module and/or RTC 312, and/or other parameter corresponding to the accuracy of the time of the RTC 312. As an example, the accuracy level of the RTC 312 may be set less than or equal to a first predetermined level (e.g., Level 1) if the accuracy or amount of time that the time of the RTC 312 is different than a correct global clock time is estimated to be more than a first predetermined amount of time (e.g., 30 minutes) or is unknown. If the accuracy of the RTC 312 is unknown, the accuracy level may be Level 0. The accuracy level of the RTC 312 may be set equal to a second predetermined level (e.g., Level 2) if the accuracy or amount of time that the time of the RTC 312 is different than the correct global clock time is estimated to be within a predetermined range (e.g., 5-30 minutes). The accuracy level of the RTC 312 may be set equal to a third predetermined level (e.g., Level 3) if the accuracy or amount of time that the time of the RTC 312 is different than the correct global clock time is less than a second predetermined amount of time (e.g., less than 5 minutes).

At 426, if the accuracy level of the RTC 312 is Level 1 and/or less than or equal to 1 (or a first predetermined level), then operation 410 may be performed, otherwise operation 428 may be performed. At 428, if the accuracy level of the RTC 312 is equal to Level 2 and/or the second predetermined level, then operation 430 is performed, otherwise operation 432 is performed.

At 430, the PAK module 212 may allow additional permitted access time and/or increase an amount of corresponding access tolerance time. As an example, if the accuracy level is Level 2 and the RTC module is estimated to be 10 minutes of the correct global clock time, then the amount of access tolerance time may be set to 10 minutes and the permitted access period for the current user may be increased by 10 minutes to account for this error. Operation 432 may be performed subsequent to operation 430.

At 432, the PAK module 212 determines whether access is permitted for the current time indicated by the RTC taking into account the access tolerance time. If access is permitted, then operation 434 is performed, otherwise operation 438 is performed.

FIG. 5 shows an example certificate acquisition method implemented by a mobile device along with the access method of FIG. 4. Although the following operations are primarily described with respect to the implementations of FIGS. 1-3, the operations may be easily modified to apply to other implementations of the present disclosure. The operations may be iteratively performed and may be performed by, for example, the certificate and timing module 130.

The method may begin at 500. At 502, the certificate and timing module 130 may transmit credentials from the mobile device 102 to the PAK module 212 as described above. At 504, the certificate and timing module 130 may transmit a certificate from the mobile device 102 to the PAK module 212 as describe above.

At 506, the certificate and timing module 130 may receive the instruction signal from the PAK module 212 to obtain an updated certificate indicating to the certificate and timing module 130 that the previously provided certificate and/or latest certificate the vehicle 200 has is outdated.

At 508, the certificate and timing module 130 generates a signal indicating to the user of the mobile device 102 that an updated certificate is requested. The user may than move the mobile device 102 to an area where, for example, a Wi-Fi and/or Internet connection can be made to download an updated certificate from the cloud-based network server 150. For example, the user may move the mobile device 102 from a remote location to a public facility (e.g., a business, school, library, local coffee shop, etc.) that provides public access to a Wi-Fi network.

At 510, the certificate and timing module 130, subsequent to the mobile device 102 being moved to a location to enable communication with the cloud-based network server 150, transmits a certificate request signal to the cloud-based network server 150.

At 512, the certificate and timing module 130 receives an updated certificate from the cloud-based network server 150. The updated certificate may be encrypted and the certificate and timing module 130 may be unable to decrypt the updated certificate. At 514, the certificate and timing module 130 transmits the updated certificate to the PAK module 212. This may include forwarding the encrypted updated certificate to the PAK module 212, which may then decrypt the updated certificate using a key stored in, for example, the memory 218 or elsewhere in the vehicle 200. The method may end at 516.

FIG. 6 shows an example access method implemented by the PAK module 212 accounting for when a RTC time and/or date is lost. Although the following operations are primarily described with respect to the implementations of FIGS. 1-3, the operations may be easily modified to apply to other implementations of the present disclosure. The operations may be iteratively performed and may be performed by, for example, the PAK module 212.

The method may begin at 600. At 602, the PAK module 212 determines whether a local time of the RTC 312 and/or date is lost (meaning not available or accuracy is unknown). If the local time of the RTC 312 is lost, then operation 604 is performed, otherwise the method may end at 606 or some or all of the method of FIG. 4 may be performed.

At 604, the PAK module 212 generates, timestamps and/or encrypts an access period request, which may include a token (or challenge data), a time/date request, and a first timestamp. The access period request may be timestamped prior to being encrypted. In one embodiment, the access period request is not timestamped. The token may be a secret code or key (e.g., an application programming interface key) for the cloud-based network server 150 to verify that the time/date request has not been tampered with by the mobile device 102 and/or other network device.

At 608, the PAK module 212 transmits the timestamped and/or encrypted access period request to the certificate and timing module 130, which then forwards the encrypted token, first timestamp (if included) and time/date request to the cloud-based network server 150. The token and time/date (time and date) request may be included in a single timestamped and encrypted request message or signal or may be transmitted separately. The certificate and timing module 130 is unable to decrypt the encrypted token, first timestamp and time/date request.

At 610, the PAK module 212 receives a timestamped and/or encrypted time/date request (or a response message)

from the certificate and timing module 130. The timestamped and/or encrypted time/date request may include the same challenge data or other data. The other data may have been generated based on the challenge data. The other data may be a modified version of the challenge data. The timestamped and/or encrypted time/date request may include the same originally generated time/date request generated by the PAK module 212, but without the token. The response message may be encrypted and/or timestamped with a second timestamp by the cloud-based network server 150. The response message may not include the time/date request.

At 611, the PAK module 212 may determine whether the response message originated at the cloud-based network server. If the response message originated at the cloud-based network server, then operation 612 is performed, otherwise operation 618 may be performed to prevent access to the vehicle.

At 612, the PAK module 212 updates the local RTC 312 based on (i) timestamp of originally transmitted time/date request, (ii) timestamp of the time/date request or response message received from cloud-based network, (iii) a roundtrip time, and/or (iv) an arrival time of the timestamped and encrypted time/date request or the response message.

At 614, the PAK module 212 determines whether user is permitted to access the vehicle 200 based on time of updated local RTC 312. If the user has permitted access, then operation 616 is performed to permit access as described above, which may include, for example providing access to the interior of vehicle 200 and/or starting the vehicle 200. If the user is not permitted to access the vehicle 200, then operation 618 is performed to prevent access. The method may end at 620.

FIG. 7 shows an example timestamp acquisition method implemented by a mobile device along with the access method of FIG. 6. Although the following operations are primarily described with respect to the implementations of FIGS. 1-3, the operations may be easily modified to apply to other implementations of the present disclosure. The operations may be iteratively performed and may be performed by, for example, the certificate and timing module 130.

The method may begin at 700. At 702, the certificate and timing module 130 receives the access period request (or encrypted and/or timestamped token and time/date request) from the PAK module 212 at certificate and timing module 130.

At 704, the certificate and timing module 130 transmits the access period request (or encrypted and/or timestamped token and time/date request) from the PAK module 212 to the cloud-based network server 150. At 706, the certificate and timing module 130 receives the timestamped and/or encrypted time/date request (or the response message) from the cloud-based network server 150.

At 708, the certificate and timing module 130 transmits the timestamped and/or encrypted time/date request (or response message) from the certificate and timing module 130 to the PAK module 212. The method may end at 710.

FIG. 8 shows an example timestamp provision method implemented by a cloud-based network server along with the access method of FIG. 6 and timestamp acquisition method of FIG. 7. Although the following operations are primarily described with respect to the implementations of FIGS. 1-3, the operations may be easily modified to apply to other implementations of the present disclosure. The operations may be iteratively performed and may be performed by, for example, the cloud-based network server 150.

The method may being at 800. At 802, the cloud-based network server 150 receives the access period request (or encrypted and timestamped token and time/date request) from the certificate and timing module 130.

At 804, the cloud-based network server 150 decrypts the timestamped token and time/date request based on a key (e.g., an application programming interface key) stored in the server memory 154. At 806, the cloud-based network server 150 pulls out (or removes) the token from the decrypted token and time/date request.

At 808, the cloud-based network server 150 determines if the token is correct or whether the token has been tampered with. This may include comparing the received token to a token stored in the server memory 154. This may include comparing keys, secret keys, application programming interface keys, etc.

At 810, the cloud-based network server 150 sends a signal indicating that the time/date request is denied and/or a signal indicating to resend the time/date request. At 812, the cloud-based network server 150 (i) may timestamp with the second timestamp and/or encrypt the time/date request, which may be transmitted as the response message, and/or (ii) generate, timestamp with the second timestamp and/or encrypt the response message. The response message may be generated and include a global time when the response message is transmitted from the cloud-based network server to the mobile device. As stated above, the response message may or may not include the challenge data, a modified version of the challenge data or other data (e.g., a predetermined set of data) generated based on the challenge data. At 814, the cloud-based network server 150 transmits the timestamped and/or encrypted time/date request and/or the response message back to the certificate and timing module 130. The method may end at 816.

The above-described operations of FIGS. 4-8 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

An in-vehicle device for a phone as a key (PAK) system of a vehicle is described herein. The in-vehicle device includes a memory configured to store one or more applications and a date, a clock configured to maintain a local time, and a control module. The control module is configured to execute the one or more applications and when executing the one or more applications the control module is configured to determine an age of a latest certificate obtained by the control module, wherein the latest certificate comprises license information, and determine whether the latest certificate or signature of the certificate is outdated. If the latest certificate or the signature is outdated, the control module is configured to transmit an instruction signal from the vehicle to a mobile device of a user to obtain updated certificate. If the certificate or the signature is not outdated, the control module is configured to determine whether the license information is accurate. Based on whether the license information is accurate, the control module is configured to determine an accuracy level of at least one of the local time or the date. Based on the accuracy level of the at least one of the local time or the date, the control module is configured to adjust an access tolerance time, permit the user to access the vehicle, or transmit the instruction signal from the vehicle to the mobile device to obtain the updated certificate.

In other features, the license information includes an identifier of the user, an identifier of the vehicle, and a period of time indicating when the user is permitted access to the vehicle.

In other features, the control module is further configured to receive credential information from the mobile device, while determining whether the license information is correct, determining whether the credential information is correct, and based on whether the credential information is correct, determine the accuracy level of the at least one of the local time or the date.

In other features, the control module is further configured to receive a first certificate from the mobile device, access a second certificate stored in the memory, and determine which one of the first certificate and the second certificate is the latest certificate.

In other features, the control module is further configured to receive the updated certificate from the mobile device, wherein the updated certificate originates at a cloud-based network server and update the local time based on a timestamp of the updated certificate.

In other features, the control module is further configured to determine whether license information in the updated certificate is accurate and based on whether the license information in the updated certificate is accurate and indicates that the user is permitted to access the vehicle during a current period of time, at least one of provide access to an interior of the vehicle or start the vehicle.

In other features, the control module is further configured to, if the accuracy level of the local time is less than or equal to a first predetermined accuracy level, transmit the instruction signal from the vehicle to the mobile device to obtain the updated certificate. If the accuracy level of the local time is equal to a second predetermined level, the control module is configured to adjust the access tolerance time. If the accuracy level of the local time is greater than the second predetermined level, the control module is configure dto permit the user to access the vehicle.

In other features, a PAK system includes the in-vehicle device of claim and the mobile device comprises a mobile device control module configured to receive the instruction signal, based on the instruction signal, obtain the updated certificate, and transmit the updated certificate to the in-vehicle device.

A method is also provided and includes operating a phone as a key (PAK) system for a vehicle. The method includes storing a date in a memory of the vehicle;

maintaining a local time and determining an age of a latest certificate obtained by a control module of the vehicle, wherein the latest certificate comprises license information. The method also includes determining whether the latest certificate or signature of the certificate is outdated. The method also includes, if the latest certificate or the signature is outdated, transmitting an instruction signal from the vehicle to a mobile device of a user to obtain updated certificate. The method also includes, if the certificate or the signature is not outdated, determining whether the license information is accurate. The method also includes, based on whether the license information is accurate, determining an accuracy level of at least one of the local time or the date. The method also includes, based on the accuracy level of the at least one of the local time or the date, adjusting an access tolerance time, permitting the user to access the vehicle, or transmitting the instruction signal from the vehicle to the mobile device to obtain the updated certificate.

In other features, the license information includes an identifier of a user, an identifier of the vehicle, and a period of time indicating when the user is permitted access to the vehicle.

In other features, the method further includes receiving credential information from the mobile device, while determining whether the license information is correct, determining whether the credential information is correct, and based on whether the credential information is correct, determining the accuracy level of the at least one of the local time or the date.

In other features, the method further includes receiving a first certificate from the mobile device, accessing a second certificate stored in the memory, and determining which one of the first certificate and the second certificate is the latest certificate.

In other features, the method further includes receiving the updated certificate from the mobile device, wherein the updated certificate originates at a cloud-based network server and updating the local time based on a timestamp of the updated certificate.

In other features, the method further includes determining whether license information in the updated certificate is accurate and, based on whether the license information in the updated certificate is accurate, indicating that the user is permitted to access the vehicle during a current period of time, at least one of providing access to an interior of the vehicle or starting the vehicle.

In other features, the method further includes, if the accuracy level of the local time is less than or equal to a first predetermined accuracy level, transmitting the instruction signal from the vehicle to the mobile device to obtain the updated certificate. The method further includes, if the accuracy level of the local time is equal to a second predetermined level, adjusting the access tolerance time. The method further includes, if the accuracy level of the local time is greater than the second predetermined level, permitting the user to access the vehicle.

In other features, the method further includes receiving the instruction signal at the mobile device, based on the instruction signal, obtaining the updated certificate, and transmitting the updated certificate to the vehicle.

An in-vehicle device for a phone as a key (PAK) system of a vehicle is disclosed and includes a memory configured to store one or more applications and a date, a clock configured to maintain a local time, and a control module. The control module is configured to execute the one or more applications and when executing the one or more applications the control module is configured to determine whether at least one of the local time or the date is lost. Based on whether the at least one of the local time or the date is lost, the control module is configured to generate, timestamp and encrypt an access period request, wherein the access period request includes challenge data and a time and date request. The control module is further configured to transmit the timestamped and encrypted request to a cloud-based network server via a mobile device of a user, wherein the timestamped and encrypted request is transmitted to the mobile device for subsequent forwarding to the cloud-based network server. The control module is configured to receive a response message from the mobile device based on the timestamped and encrypted request. The control module is further configured to verify and authenticate the response message, update at least one of the local time or the date based on content in the response message, determine whether access to the vehicle is permitted based on the updated at least one of the local time or the date, and permit access to the vehicle if the updated at least one of the local time or date is within a predetermined and permitted access period for the user.

In other features, the response message includes the challenge data.

In other features, the response message does not include the challenge data.

In other features, the response message includes a modified version of the challenge data.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An in-vehicle device for a phone as a key (PAK) system of a vehicle, the in-vehicle device comprising:
a memory configured to store one or more applications and a date;
a clock configured to maintain a local time; and
a control module configured to execute the one or more applications and when executing the one or more applications the control module is configured to
determine an age of a latest certificate obtained by the control module, wherein the latest certificate comprises license information,
determine whether the latest certificate or signature of the certificate is outdated,
if the latest certificate or the signature is outdated, transmit an instruction signal from the vehicle to a mobile device of a user to obtain updated certificate,
if the certificate or the signature is not outdated, determine whether the license information is accurate,
based on whether the license information is accurate, determine an accuracy level of at least one of the local time or the date, and
based on the accuracy level of the at least one of the local time or the date, adjust an access tolerance time, permit the user to access the vehicle, or transmit the instruction signal from the vehicle to the mobile device to obtain the updated certificate.

2. The in-vehicle device of claim 1, wherein the license information includes an identifier of the user, an identifier of the vehicle, and a period of time indicating when the user is permitted access to the vehicle.

3. The in-vehicle device of claim 1, wherein the control module is further configured to:
receive credential information from the mobile device;
while determining whether the license information is correct, determining whether the credential information is correct; and
based on whether the credential information is correct, determine the accuracy level of the at least one of the local time or the date.

4. The in-vehicle device of claim 1, wherein the control module is further configured to:
receive a first certificate from the mobile device;
access a second certificate stored in the memory; and
determine which one of the first certificate and the second certificate is the latest certificate.

5. The in-vehicle device of claim 1, wherein the control module is further configured to:
receive the updated certificate from the mobile device, wherein the updated certificate originates at a cloud-based network server; and
update the local time based on a timestamp of the updated certificate.

6. The in-vehicle device of claim 5, wherein the control module is further configured to:
determine whether license information in the updated certificate is accurate; and
based on whether the license information in the updated certificate is accurate and indicates that the user is permitted to access the vehicle during a current period of time, at least one of provide access to an interior of the vehicle or start the vehicle.

7. The in-vehicle device of claim 1, wherein the control module is further configured to:
if the accuracy level of the local time is less than or equal to a first predetermined accuracy level, transmit the instruction signal from the vehicle to the mobile device to obtain the updated certificate;
if the accuracy level of the local time is equal to a second predetermined level, adjust the access tolerance time; and
if the accuracy level of the local time is greater than the second predetermined level, permit the user to access the vehicle.

8. A PAK system comprising:
the in-vehicle device of claim 1; and
the mobile device comprising a mobile device control module configured to
receive the instruction signal,
based on the instruction signal, obtain the updated certificate, and
transmit the updated certificate to the in-vehicle device.

9. A method of operating a phone as a key (PAK) system for a vehicle, the method comprising:
storing a date in a memory of the vehicle;
maintaining a local time;
determining an age of a latest certificate obtained by a control module of the vehicle, wherein the latest certificate comprises license information;
determining whether the latest certificate or signature of the certificate is outdated;
if the latest certificate or the signature is outdated, transmitting an instruction signal from the vehicle to a mobile device of a user to obtain updated certificate;
if the certificate or the signature is not outdated, determining whether the license information is accurate;
based on whether the license information is accurate, determining an accuracy level of at least one of the local time or the date; and
based on the accuracy level of the at least one of the local time or the date, adjusting an access tolerance time, permitting the user to access the vehicle, or transmitting the instruction signal from the vehicle to the mobile device to obtain the updated certificate.

10. The method of claim 9, wherein the license information includes an identifier of a user, an identifier of the vehicle, and a period of time indicating when the user is permitted access to the vehicle.

11. The method of claim 9, further comprising:
receiving credential information from the mobile device;
while determining whether the license information is correct, determining whether the credential information is correct; and
based on whether the credential information is correct, determining the accuracy level of the at least one of the local time or the date.

12. The method of claim 9, further comprising:
receiving a first certificate from the mobile device;

accessing a second certificate stored in the memory; and
determining which one of the first certificate and the second certificate is the latest certificate.

13. The method of claim 9, further comprising:
receiving the updated certificate from the mobile device, wherein the updated certificate originates at a cloud-based network server; and
updating the local time based on a timestamp of the updated certificate.

14. The method of claim 13, further comprising:
determining whether license information in the updated certificate is accurate; and
based on whether the license information in the updated certificate is accurate, indicating that the user is permitted to access the vehicle during a current period of time, at least one of providing access to an interior of the vehicle or starting the vehicle.

15. The method of claim 9, further comprising:
if the accuracy level of the local time is less than or equal to a first predetermined accuracy level, transmitting the instruction signal from the vehicle to the mobile device to obtain the updated certificate;
if the accuracy level of the local time is equal to a second predetermined level, adjusting the access tolerance time; and
if the accuracy level of the local time is greater than the second predetermined level, permitting the user to access the vehicle.

16. The method of claim 9, further comprising:
receiving the instruction signal at the mobile device;
based on the instruction signal, obtaining the updated certificate; and
transmitting the updated certificate to the vehicle.

17. An in-vehicle device for a phone as a key (PAK) system of a vehicle, the in-vehicle comprising:

a memory configured to store one or more applications and a date;
a clock configured to maintain a local time; and
a control module configured to execute the one or more applications and when executing the one or more applications the control module is configured to determine whether at least one of the local time or the date is lost, based on whether the at least one of the local time or the date is lost,
generate, timestamp and encrypt an access period request, wherein the access period request includes challenge data and a time and date request,
transmit the timestamped and encrypted request to a cloud-based network server via a mobile device of a user, wherein the timestamped and encrypted request is transmitted to the mobile device for subsequent forwarding to the cloud-based network server,
receive a response message from the mobile device based on the timestamped and encrypted request,
verify and authenticate the response message,
update at least one of the local time or the date based on content in the response message,
determine whether access to the vehicle is permitted based on the updated at least one of the local time or the date, and
permit access to the vehicle if the updated at least one of the local time or date is within a predetermined and permitted access period for the user.

18. The in-vehicle of claim 17, wherein the response message includes the challenge data.

19. The in-vehicle of claim 17, wherein the response message does not include the challenge data.

20. The in-vehicle of claim 17, wherein the response message includes a modified version of the challenge data.

* * * * *